United States Patent
Sun (10) Patent No.: US 8,718,576 B2
(45) Date of Patent: May 6, 2014

(54) RADIO FREQUENCY MODULATOR AND METHOD THEREOF

(75) Inventor: Chih-Hao Sun, Taipei County (TW)

(73) Assignee: Mediatek Inc., Science-Based Industrial Park, Hsin-Chu (TW)

(*) Notice: Subject to any disclaimer, the term of this patent is extended or adjusted under 35 U.S.C. 154(b) by 629 days.

(21) Appl. No.: 12/703,775

(22) Filed: Feb. 11, 2010

(65) Prior Publication Data

US 2011/0193606 A1    Aug. 11, 2011

(51) Int. Cl.
*H04B 1/04* (2006.01)
*H03C 1/62* (2006.01)

(52) U.S. Cl.
USPC ........................................ 455/114.1; 375/296

(58) Field of Classification Search
USPC .................... 455/114.1–114.3, 126
See application file for complete search history.

(56) References Cited

U.S. PATENT DOCUMENTS

| | | | | |
|---|---|---|---|---|
| 6,246,286 | B1* | 6/2001 | Persson | 330/149 |
| 6,313,703 | B1* | 11/2001 | Wright et al. | 330/149 |
| 2006/0066362 | A1* | 3/2006 | Koutani et al. | 327/103 |

FOREIGN PATENT DOCUMENTS

| CN | 1218475 C | 9/2005 |
|---|---|---|
| CN | 101322311 A | 12/2008 |

* cited by examiner

*Primary Examiner* — Lee Nguyen
(74) *Attorney, Agent, or Firm* — Winston Hsu; Scott Margo (57) ABSTRACT

A radio frequency (RF) modulator includes: converting means for up-converting a first and second baseband signals into a first and second up-converted signals with a reference clock, wherein a phase difference between the first and second baseband signals substantially equals 180°/N; and combining means for combining the first and second up-converted signals to generate an output signal.

25 Claims, 10 Drawing Sheets

FIG. 10

RADIO FREQUENCY MODULATOR AND METHOD THEREOF

BACKGROUND

The present invention relates to a signal processing apparatus and related method, and more particularly to a signal transmitter utilizing a reference clock to up-convert two input signals with specified phase difference, and a related method.

The nonlinear characteristic of the circuit element in the signal transmitter may generate an inter-modulating distortion upon the RF signal, such that the third order inter-modulation (IM3) signal emerges around the center frequency of the RF signal. More specifically, there are two mechanisms leading to the third order inter-modulating distortion. Firstly, when the baseband signal is up-converted by a clock signal through a mixer in the signal transmitter, the nonlinearity of the mixer may induce an IM3 signal, which is sourced from the $3^{rd}$-order harmonic of the baseband signal. Secondly, when the up-converted signal is power-amplified by a power amplifying stage, such as a power gain amplifier (PGA) or a power amplifier (PA), the nonlinear operation of the power amplifying stage clock signal may also induce the IM3 signal around the center frequency of the RF signal. Furthermore, to save the power consumption of the signal transmitter, a low power supply strategic is always adopted when designing the signal transmitter; however the third order inter-modulating distortion can become worse when the signal transmitter is operated under the lower power supply. Therefore, improving the inter-modulating distortion in the transmitted signal of a signal transmitter is a significant concern in the field of wireless transceivers.

SUMMARY

According to a first embodiment of the present invention, a radio frequency (RF) modulator is disclosed. The RF modulator comprises up-converting means and combining means. The converting means up-converts a first and second baseband signals into a first and second up-converted signals with a reference clock, wherein a phase difference between the first and second baseband signals substantially equals 180°/N. The combining means combines the first and second up-converted signals to generate an output signal.

According to a second embodiment of the present invention, a signal processing apparatus is disclosed. The signal processing apparatus comprises a first up-converter, a second up-converter, a first amplifier, a second amplifier, and a combining circuit. The first up-converter receives a first baseband signal with a first phase and receives a reference clock for up-converting the first baseband signal to generate a first up-converted signal with the reference clock. The second up-converter receives a second baseband signal with a second phase different from the first phase and receives the reference clock for up-converting the second baseband signal to generate a second up-converted signal with the reference clock. The first amplifier is coupled to the first up-converter for amplifying the first up-converted signal to generate a first amplified signal. The second amplifier is coupled to the second up-converter for amplifying the second up-converted signal to generate a second amplified signal. The combining circuit is coupled to the first amplifier and the second amplifier for combining the first amplified signal and the second amplified signal to generate an output signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
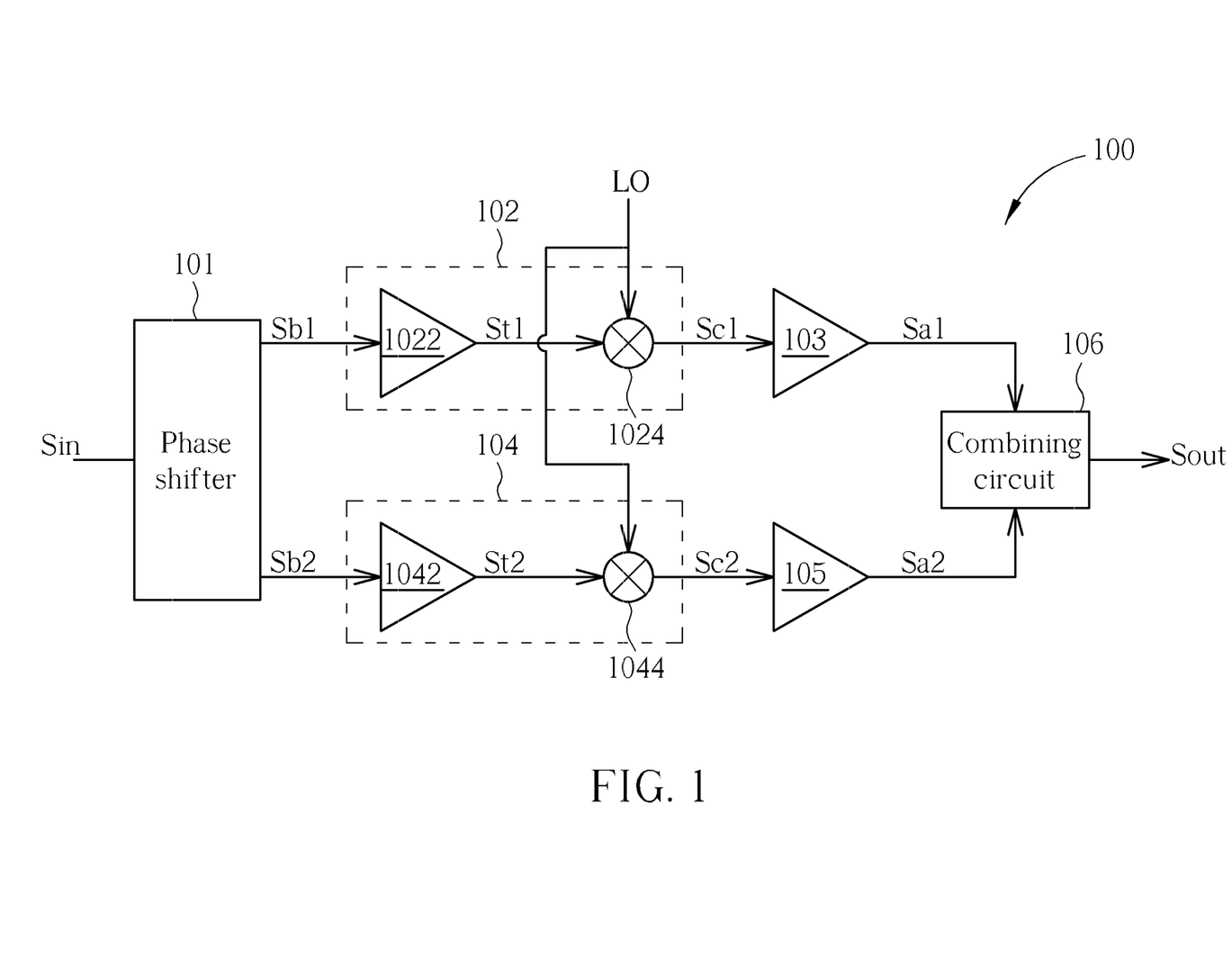
FIG. 1 is a diagram illustrating a signal processing apparatus according to an embodiment of the present invention.

FIG. 1 is a diagram illustrating a signal processing apparatus 100 according to an embodiment of the present invention. The signal processing apparatus 100 is applicable in a signal transmitter, such as a radio frequency (RF) modulator. The signal processing apparatus 100 comprises a first up-converter 102, a first amplifier 103, a second up-converter 104, a second amplifier 105, and a combining circuit 106. The first up-converter 102 and the second up-converter 104 may be configured as converting means for up-converting a first and second baseband signals Sb1 and Sb2 into a first and second up-converted signals Sc1 and Sc2 with a reference clock LO. The phase difference between the two baseband signals Sb1 and Sb2 substantially equals 180°/N.

In one embodiment, the first and second baseband signals Sb1 and Sb2 can be generated by a phase shifter 101. The phase shifter 101 receives a baseband input signal Sin and generates a first baseband signal Sb1 with a first phase P1 and a second baseband signal Sb2 with a second phase P2 different from the first phase P1 according to the input signal Sin. Please note that, the first phase P1 and the second phase P2 can be measured by referring to the same reference phase. Furthermore, the phase shifter 101 can be embedded in a baseband chip or be implemented by a physical circuitry outside the baseband chip. However, this embodiment does not limit in how to generate or provide the first and second baseband signals Sb1 and Sb2 whose phase difference is substantially equal to 180°/N.

The first up-converter 102 is coupled to the phase shifter 101 to receive the first baseband signal Sb1 and receive a reference clock LO for up-converting the first baseband signal Sb1 to generate a first up-converted signal Sc1. The second up-converter 104 is coupled to the phase shifter 101 to receive the second baseband signal Sb2 and receive the reference clock LO for up-converting the second baseband signal Sb2 to generate a second up-converted signal Sc2. The first amplifier 103 is coupled to the first up-converter 102 for amplifying the first up-converted signal Sc1 to generate a first amplified signal Sa1. The second amplifier 105 is coupled to the second up-converter 104 for amplifying the second up-converted signal Sc2 to generate a second amplified signal Sat. The combining circuit 106 is coupled to the first amplifier 103 and the second amplifier 105 for combining the first amplified signal Sa1 and the second amplified signal Sat to generate an output signal Sout. In this embodiment, the output signal Sout is a radio frequency signal.

The first up-converter 102 comprises a first transconducting circuit 1022 and a first mixer 1024. The first transconducting circuit receives the first baseband signal Sb1 for transforming the first baseband signal Sb1 into a first transconducted signal St1. The first mixer 1024 is coupled to the first transconducting circuit 1022 and the reference clock LO for mixing the first transconducted signal St1 to generate the first up-converted signal Sc1. The second up-converter 104 comprises a second transconducting circuit 1042 and a second mixer 1044. The second transconducting circuit 1042 receives the second baseband signal Sb2 for transforming the second baseband signal Sb1 into a second transconducted signal St2. The second mixer 1044 is coupled to the second transconducting circuit 1042 and the reference clock LO for mixing the second transconducted signal St2 to generate the second up-converted signal Sc2.

In this embodiment, frequency of the reference clock LO is higher than those of the first baseband signal Sb1 and the second baseband signal Sb2, while frequency of the first baseband signal Sb1 is equal to the frequency of the second baseband signal Sb2. Therefore, the first up-converter 102 and the second up-converter 104 are utilized to up-convert the first baseband signal Sb1 and the second baseband signal Sb2 to generate the first up-converted signal Sc1 and the second up-converted signal Sc2, respectively. Furthermore, the first amplified signal Sa1 comprises a first specific amplified signal Sim1, and the second amplified signal Sat comprises a second specific amplified signal Sim2; and when the first specific amplified signal Sim1 and the second specific amplified signal Sim2 are Nth order inter-modulation tones of the first amplified signal Sa1 and the second amplified signal Sat, respectively, the phase shifter 101 sets the phase difference between the first phase P1 and the second phase P2 to be substantially 180°/N.

Figure 2:
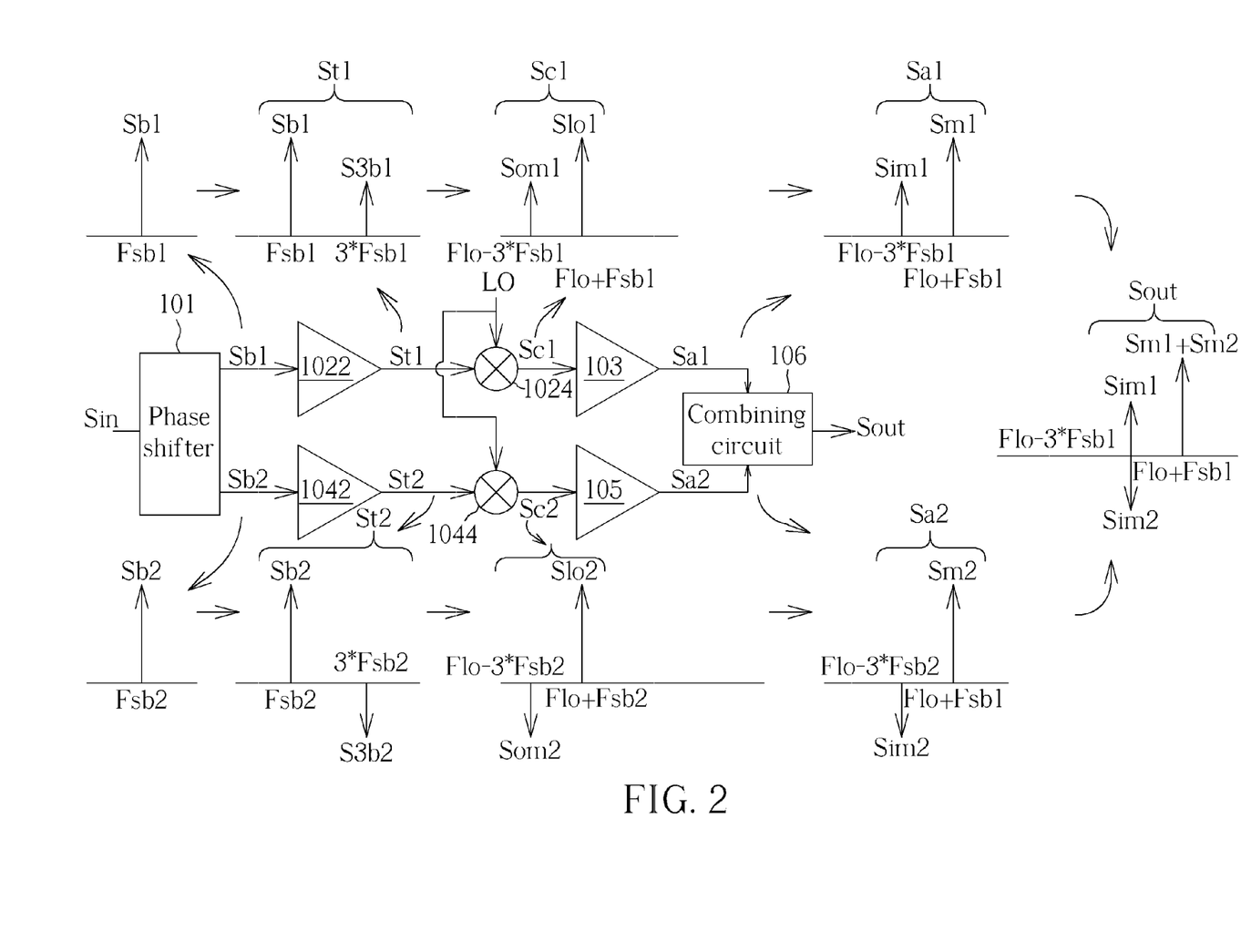
FIG. 2 is a spectrum diagram illustrating a first baseband signal, a second baseband signal, a first transconducted signal, a second transconducted signal, a first up-converted signal, a second up-converted signal, a first amplified signal, a second amplified signal, and an output signal of the signal processing apparatus shown in FIG. 1.

More specifically, the first specific amplified signal Sim1 is caused by the non-ideal electrical characteristic, such as the nonlinear characteristic, of the first up-converter 102 and the first amplifier 103, and the second specific amplified signal Sim2 is caused by the non-ideal electrical characteristic of the second up-converter 104 and the second amplifier 105. It should be noted that the first amplified signal Sa1 further contains a first main signal Sm1, and the second amplified signal Sat further contains a second main signal Sm2 as shown in FIG. 2. FIG. 2 is a spectrum diagram illustrating the first baseband signal Sb1, the second baseband signal Sb2, the first transconducted signal St1, the second transconducted signal St2, the first up-converted signal Sc1, the second up-converted signal Sc2, the first amplified signal Sa1, the second amplified signal Sat, and the output signal Sout of the signal processing apparatus 100 shown in FIG. 1.

In addition, to more clearly illustrate the features of the embodiment, the operation of the signal processing apparatus 100 is described by setting (i.e., by the phase shifter 101) the first phase P1 and the second phase P2 to be 60° out of phase, i.e., 180°/3. In other words, the first specific amplified signal Sim1 and the second specific amplified signal Sim2 are the third order inter-modulation tones (i.e., N=3) of the first amplified signal Sa1 and the second amplified signal Sat, respectively, and one of the aims of the signal processing apparatus 100 is to substantially eliminate the third order inter-modulation tones in the output signal Sout. Please note that, the first phase P1 and the second phase P2 may not be exactly 60° (i.e., 180°/N) out of phase since the preceding circuits of the phase shifter 101 may induce some offsets upon the input signal Sin, which may consequently affect the performance of eliminating the third order inter-modulation tones in the output signal Sout. Therefore, in another embodiment (i.e., FIG. 9) of the present invention, an adjusting circuit is further included to detect the output signal Sout and to adjust the phase shifter 101 on the other hand. Furthermore, since the first phase P1 and the second phase P2 are 60° out of phase, for example, the second phase P2 can be referred as 60° while the first phase P1 is referred as 0° hereinafter for brevity.

Please refer to FIG. 1 in conjunction with FIG. 2. When the first baseband signal Sb1 with the first phase P1 of 0° is received by the first transconducting circuit 1022, the first transconducting circuit 1022 transforms the voltage formed by the first baseband signal Sb1 into the current formed by the first transconducted signal St1. In the first transconducted signal St1, a third-order harmonic signal 53b1 located at frequency 3*Fsb1 emerges because of the nonlinear characteristic of the first transconducting circuit 1022, wherein the frequency Fsb1 is the frequency of the first baseband signal Sb1. Since the phase of the first baseband signal Sb1 is 0°, the phase of the third-order harmonic signal 53b1 is also 0°. When the first transconducted signal St1 is mixed by the reference clock LO (i.e., up-converted by the first mixer 1024 and the frequency of the reference clock LO is Flo), except for the required signal Slo1, at least one more signals, i.e., an inter-modulation signal Som1, emerge in the first up-converted signal Sc1, in which the required signal Slo1 and the inter-modulation signal Som1 are located at the frequencies of Flo−3*Fsb1 and Flo+Fsb1 respectively. Similarly, the phases of the required signal Slo1 and the inter-modulation signal Som1 are 0°.

Then, the first up-converted signal Sc1 is power-amplified by the first amplifier 103 to generate the first amplified signal Sa1, and the nonlinear characteristic of the first amplifier 103 induces the third order inter-modulation tone (i.e., the first specific amplified signal Sim1) emerging in the first amplified signal Sa1, in which the frequencies of the first specific amplified signal Sim1 and the first main signal Sm1 are located at frequencies of Flo−3*Fsb1 and the Flo+Fsb1. Therefore, two signals (i.e., the first specific amplified signal Sim1 and the inter-modulation signal Som1) appear at the frequency Flo−3*Fsb1, and the two signals, which are 0°, appear as the third order inter-modulation tone of the first main signal Sm1.

When the second baseband signal Sb2 with the second phase P2 of 60° is received by the second transconducting circuit 1042, the second transconducting circuit 1042 transforms the voltage formed by the second baseband signal Sb2 into the current formed by the second transconducted signal St2. In the second transconducted signal St2, a third-order harmonic signal S3b2 located at frequency 3*Fsb2 emerges because of the nonlinear characteristic of the second transconducting circuit 1042, wherein Fsb2 is the frequency of the second baseband signal Sb2. Since the phase of the second baseband signal Sb2 is 60°, the phase of the third-order harmonic signal S3b2 is 180°. When the second transconducted signal St2 is mixed by the reference clock LO (i.e., up-converted by the first mixer 1044), except for the required signal Slo2, at least one more signals, i.e., a inter-modulation signal Som2, emerge in the second up-converted signal Sc2, in which the required signal Slo2 and the inter-modulation signal Som2 are located at the frequencies of Flo−3*Fsb2 and Flo+Fsb2 respectively. Similarly, the phase of the required signal Slo2 is 60°, and the phase of the inter-modulation signal Som2 is 180°.

Then, the second up-converted signal Sc2 is power-amplified by the second amplifier 105 to generate the second amplified signal Sa2, and the nonlinear characteristic of the second amplifier 105 induces the third order inter-modulation tone (i.e., the second specific amplified signal Sim2) emerging in the second amplified signal Sa2, in which the frequencies of the second specific amplified signal Sim2 and the second main signal Sm2 are located at the frequencies of Flo−3*Fsb2 and Flo+Fsb2. Therefore, two signals (i.e., the second specific amplified signal Sim2 and the inter-modulation signal Som2) appear at the frequency Flo−3*Fsb2, and the two signals, which are 180°, appear as the third order inter-modulation tone of the second main signal Sm2.

Then, the first amplified signal Sa1 and the second amplified signal Sat are combined by the combining circuit 106 to generate the output signal Sout. It should be noted that, in this embodiment, the combining circuit 106 may be a signal path, such as a wire, connected to the output terminals of the first amplifier 103 and the second amplifier 105. In addition, since the frequency Fsb1 of the first baseband signal Sb1 is equal to the frequency Fsb2 of the second baseband signal Sb2, the first specific amplified Sim1 and the second specific amplified Sim2 appear at the same frequency in the output signal Sout. Furthermore, in the output signal Sout, the first specific amplified Sim1 is substantially cancelled out by the second specific amplified Sim2 since the first specific amplified Sim1 and the second specific amplified Sim2 are substantially 180° out of phase, and the first main signal Sm1 and the second main signal Sm2 are combined to form the required transmitted signal. It should be noted that, since the first main signal Sm1 and the second main signal Sm2 are substantially 60° out of phase, the power of the required transmitted signal may smaller than the total power of the first main signal Sm1 and the second main signal Sm2. For example, if the power of the first main signal Sm1 is Po1 and the power of the second main signal Sm2 is Po2, then the power of the required transmitted signal is $$Po1 + \frac{\sqrt{3}}{2} * Po2.$$

Accordingly, the third order inter-modulation tones (i.e., the inter-modulation signal Som1, Som2, the first specific amplified signal Sim1, and the second specific amplified signal Sim2) generated by the nonlinear characteristic of the signal processing apparatus 100 are eliminated. By using the present method of the embodiment, the linearity requirement of the first transconducting circuit 1022 and the second transconducting circuit 1042 can be relaxed. Therefore, the present embodiment is useful in a radio frequency modulator where nonlinear voltage-to-current conversion (i.e., the first transconducting circuit 1022 and the second transconducting circuit 1042) is involved. It should be noted that the above mentioned embodiment only serves as an example, and those skilled in this art will understand that the embodiment can eliminate any order inter-modulation tone by setting the phase difference between the first baseband signal Sb1 and the second baseband signal Sb2.

Figure 3:
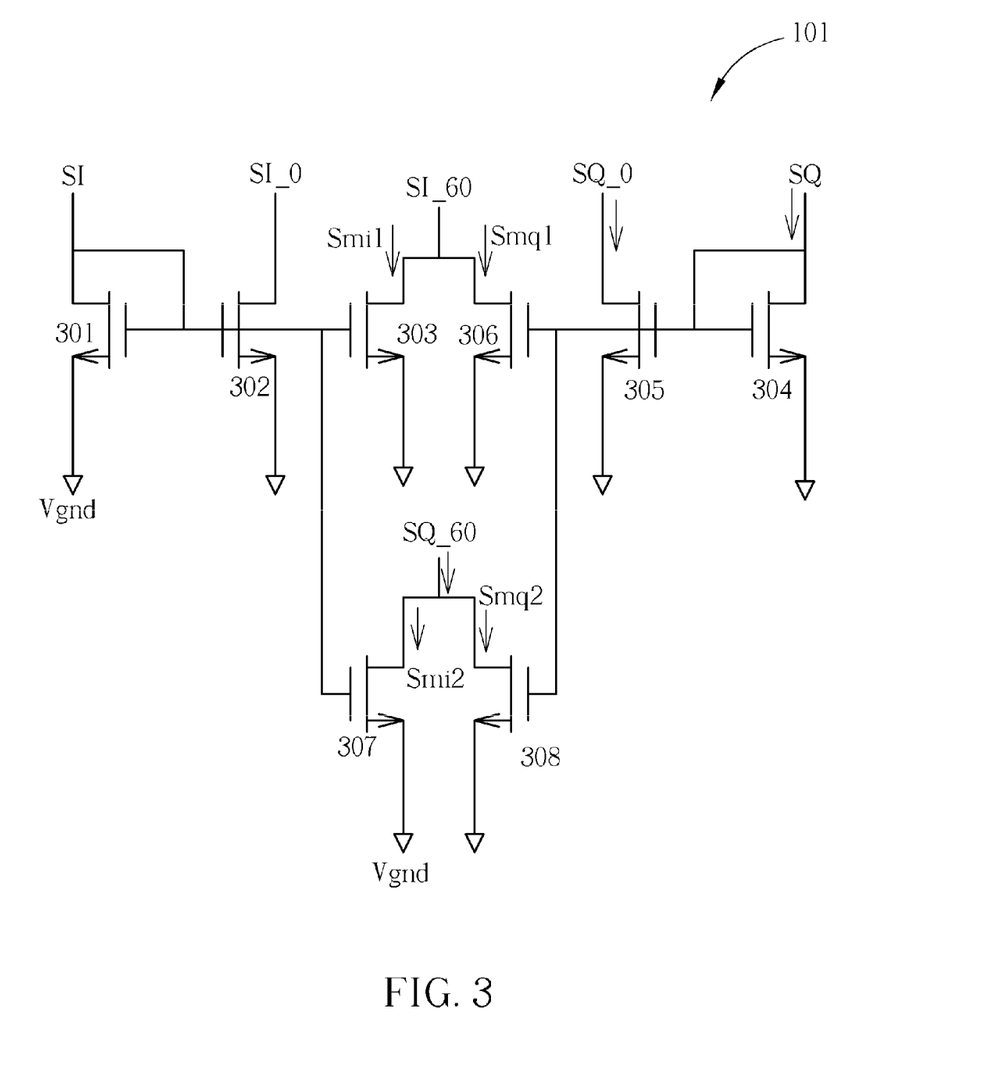
FIG. 3 is a diagram illustrating a phase shifter according to a first embodiment of the present invention.

FIG. 3 is a diagram illustrating the phase shifter 101 according to a first embodiment of the present invention. The phase shifter 101 is operated in current mode. It should be noted that, in this embodiment, the input signal Sin comprises an I-channel input signal SI and a Q-channel input signal SQ. The phase shifter 101 comprises a first transistor 301, a second transistor 302, a third transistor 303, a fourth transistor 304, a fifth transistor 305, a sixth transistor 306, a seventh transistor 307, and an eighth transistor 308. The first transistor 301 has a drain terminal coupled to the I-channel input signal SI, a source terminal coupled to a reference voltage Vgnd, and a gate terminal coupled to the drain terminal of the first transistor 301. The second transistor 302 has a gate terminal coupled to the gate terminal of the first transistor 301, a source terminal coupled to the reference voltage Vgnd, and a drain terminal outputting an I-channel signal SI_0 of the first baseband signal Sb1. The third transistor 303 has a gate terminal coupled to the gate terminal of the first transistor 301, a source terminal coupled to the reference voltage, and a drain terminal. The fourth transistor 304 has a drain terminal coupled to the Q-channel input signal SQ, a source terminal coupled to the reference voltage Vgnd, and a gate terminal coupled to the drain terminal of the fourth transistor 304. The fifth transistor 305 has a gate terminal coupled to the gate terminal of the fourth transistor 304, a source terminal coupled to the reference voltage Vgnd, and a drain terminal outputting a Q-channel signal SQ_0 of the first baseband signal Sb1. The sixth transistor 306 has a gate terminal coupled to the gate terminal of the fourth transistor 304, a source terminal coupled to the reference voltage Vgnd, and a drain terminal coupled to the drain terminal of the third transistor 303 for outputting one of an I-channel signal SI_60 and a Q-channel signal SQ_60 of the second baseband signal Sb2. The seventh transistor 307 has a gate terminal coupled to the gate terminal of the first transistor 301, a source terminal coupled to the reference voltage Vgnd, and a drain terminal. The eighth transistor 308 has a gate terminal coupled to the gate terminal of the fourth transistor 304, a source terminal coupled to the reference voltage Vgnd, and a drain terminal coupled to the drain terminal of the seventh transistor 307 for outputting the other of the I-channel signal SI_60 and the Q-channel signal SQ_60 of the second baseband signal Sb2.

In this embodiment, the drain terminal of the third transistor 303 is utilized for outputting the I-channel signal SI_60 of the second baseband signal Sb2, and the drain terminal of the seventh transistor 307 is utilized for outputting the Q-channel signal SQ_60 of the second baseband signal Sb2. Furthermore, the aspect ratios of the second transistor 302, the third transistor 303, the fifth transistor 305, and the sixth transistor 306 are substantially equal to 1:A:1:B, and the aspect ratios of the second transistor 302, the seventh transistor 307, the fifth transistor 305, and the eighth transistor 308 are substantially equal to 1:B:1:A, and B/A is substantially equal to $$\tan\left(\frac{180°}{N}\right).$$

Figure 4:
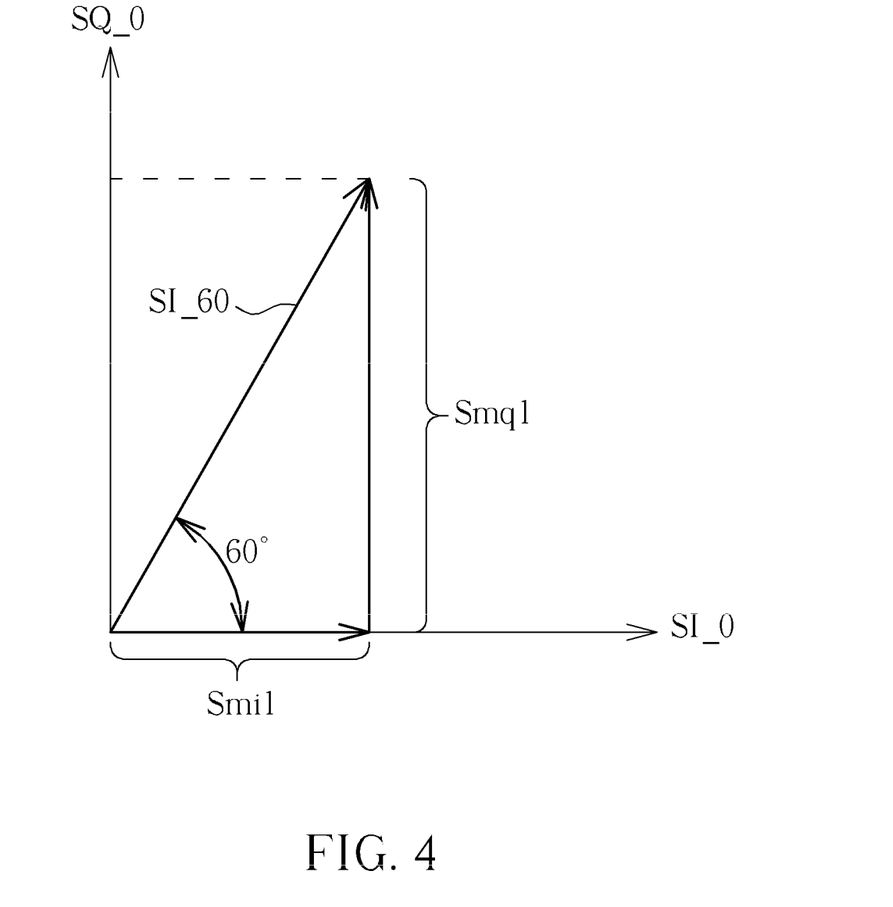
FIG. 4 is a phase diagram illustrating an I-channel signal of the first baseband signal, a Q-channel signal of the first baseband signal, and an I-channel signal of the second baseband signal in FIG. 3.
Figure 5:
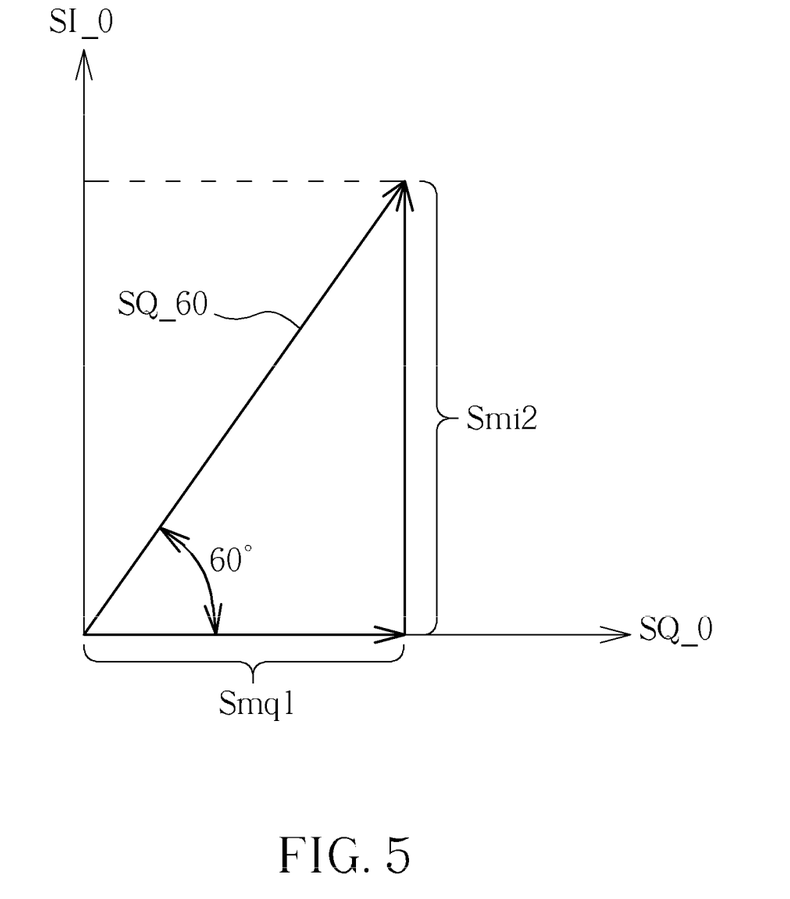
FIG. 5 is a phase diagram illustrating the I-channel signal of the first baseband signal, the Q-channel signal of the first baseband signal, and the Q-channel signal of the second baseband signal in FIG. 3.

For the above-mentioned example shown in FIG. 2, when the phase difference between the phases of the I-channel signal SI_0 of the first baseband signal Sb1 and the I-channel signal SI_60 of the second baseband signal Sb2 (i.e., the phase difference between the first phase P1 and the second phase P2) is required to be 60°, then N is equal to 3. When N=3, then $$\tan\left(\frac{180°}{N}\right)$$

is √3. Therefore, when the aspect ratios of the second transistor 302, the third transistor 303, the fifth transistor 305, and the sixth transistor 306 are set to M:M/2:M:√3M/2, the phase difference between the phases of the I-channel signal SI_0 of the first baseband signal Sb1 and the I-channel signal SI_60 of the second baseband signal Sb2 is 60° as shown in FIG. 4. Similarly, when the aspect ratios of the second transistor 302, the seventh transistor 307, the fifth transistor 305, and the eighth transistor 308 are set to M:√3M/2:M: M/2, the phase difference between the phases of the Q-channel signal SQ_0 of the first baseband signal Sb1 and the Q-channel signal SQ_60 of the second baseband signal Sb2 is 60° as shown in FIG. 5. It should be noted that the aspect ratios of the first transistor 301 and the fourth transistor 304 are also set to M.

FIG. 4 is a phase diagram illustrating the I-channel signal SI_0 of the first baseband signal Sb1, the Q-channel signal SQ_0 of the first baseband signal Sb1, and the I-channel signal SI_60 of the second baseband signal Sb2 in FIG. 3. FIG. 5 is a phase diagram illustrating the I-channel signal SI_0 of the first baseband signal Sb1, the Q-channel signal SQ_0 of the first baseband signal Sb1, and the Q-channel signal SQ_60 of the second baseband signal Sb2 in FIG. 3. When the I-channel input signal SI of the input signal Sin is inputted to the drain terminal of the first transistor 301, the second transistor 302 mirrors the I-channel input signal SI to output the I-channel signal SI_0 of the first baseband signal Sb1 at the drain terminal of the second transistor 302, in which the I-channel input signal SI and the I-channel signal SI_0 are in phase. Similarly, when the Q-channel input signal SQ of the input signal Sin is inputted to the drain terminal of the fourth transistor 304, the fifth transistor 305 mirrors the Q-channel input signal SQ to output the Q-channel signal SQ_0 of the first baseband signal Sb1 at the drain terminal of the fifth transistor 305, in which the Q-channel input signal SQ and the Q-channel signal SQ_0 are in phase. When the third transistor 303 mirrors the I-channel input signal SI, a mirrored signal Smi1 is outputted at the drain terminal of the third transistor 303. At the same time, the sixth transistor 306 mirrors the Q-channel input signal SQ to output a mirrored signal Smq1 at its drain terminal. Since the phase difference between the mirrored signal Smi1 and the mirrored signal Smq1 is substantially 90°, and the magnitude of the mirrored signal Smi1 is ½ times of the magnitude of the I-channel signal SI_0, and the magnitude of the mirrored signal Smq1 is √3/2 times of the magnitude of the Q-channel signal SQ_0, the I-channel signal SI_60 being 60° with respect to the I-channel signal SI_0 is generated at the drain terminal, as shown in FIG. 4.

Similarly, when the seventh transistor 307 mirrors the I-channel input signal SI, a mirrored signal Smi2 is outputted at the drain terminal of the seventh transistor 307. At the same time, the eighth transistor 308 mirrors the Q-channel input signal SQ to output a mirrored signal Smq2 at its drain terminal. Since the phase difference between the mirrored signal Smi2 and the mirrored signal Smq2 is substantially 90°, and the magnitude of the mirrored signal Smi2 is √3/2 times the magnitude of the I-channel signal SI_0, and the magnitude of the mirrored signal Smq2 is ½ times the magnitude of the Q-channel signal SQ_0, the Q-channel signal SQ_60 being 60° with respect to the Q-channel signal SQ_0 is generated at the drain terminal, as shown in FIG. 5. It should be noted that the above mentioned embodiment only serves as an example, and those skilled in this art will understand that the phase shifter 101 shown in FIG. 3 can generate any phases of the I-channel signal SI_60 and the Q-channel signal SQ_60 through modifying the aspect ratios of the first transistor 301, the second transistor 302, the third transistor 303, the fourth transistor 304, the fifth transistor 305, the sixth transistor 306, the seventh transistor 307, and the eighth transistor 308.

Figure 6:
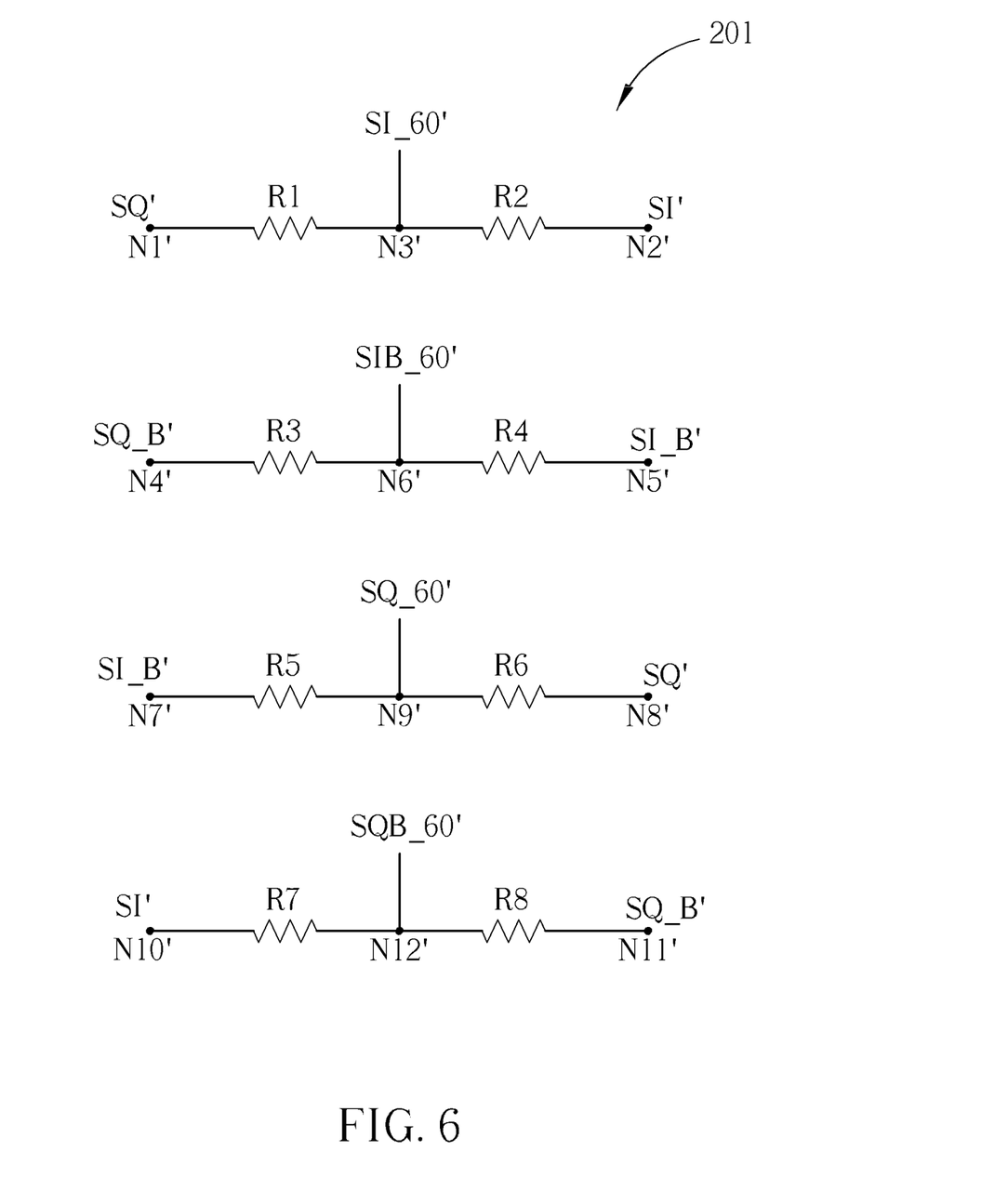
FIG. 6 is a diagram illustrating the phase shifter according to a second embodiment of the present invention.

FIG. 6 is a diagram illustrating a phase shifter 201 according to a second embodiment of the present invention. The phase shifter 201 is operated in voltage mode. It should be noted that, in this embodiment, the input signal Sin comprises an I-channel input signal SI', a complementary I-channel input signal SI_B', a Q-channel input signal SQ', and a complementary Q-channel input signal SQ_B', and the phase shifter 201 comprises a first resistor R1, a second resistor R2, a third resistor R3, a fourth resistor R4, a fifth resistor R5, a sixth resistor R6, a seventh resistor R7, and an eighth resistor R8. The first resistor R1 has a first resistance r1, wherein the first resistor R1 has a first terminal N1' coupled to the Q-channel input signal SQ'. The second resistor R2 has a second resistance r2, wherein the second resistor R2 has a first terminal N2' coupled to the I-channel input signal SI', and a second terminal N3' coupled to a second terminal of the first resistor R1 for outputting an I-channel signal SI_60' of the second baseband signal Sb2. The third resistor R3 has a third resistance r3, wherein the third resistor R3 has a first terminal N4' coupled to the complementary Q-channel input signal SQ_B'. The fourth resistor R4 has a fourth resistance r4, wherein the fourth resistor R4 has a first terminal N5' coupled to the complementary I-channel input signal SI_B', and a second terminal N6' coupled to a second terminal of the third resistor R3 for outputting an complementary I-channel signal SIB_60' of the second baseband signal Sb2. The fifth resistor R5 has a fifth resistance r5, wherein the fifth resistor R5 has a first terminal N7' coupled to the complementary I-channel input signal SI_B'. The sixth resistor R6 has a sixth resistance r6, wherein the sixth resistor R6 has a first terminal N8' coupled to the Q-channel input signal SQ', and a second terminal N9' coupled to a second terminal of the fifth resistor R5 for outputting a Q-channel signal SQ_60' of the second baseband signal Sb2. The seventh resistor R7 has a seventh resistance r7, wherein the seventh resistor R7 has a first terminal N10' coupled to the I-channel input signal SI'. The eighth resistor R8 has an eighth resistance r8, wherein the eighth resistor R8 has a first terminal N11' coupled to the complementary Q-channel input signal SQ_B', and a second terminal N12' coupled to a second terminal of the seventh resistor R7 for outputting a complementary Q-channel signal SQB_60' of the second baseband signal Sb2.

In this embodiment, the ratios of the second resistance r2 to the first resistance r1, the fourth resistance r4 to the third resistance r3, the sixth resistance r6 to the fifth resistance r5, and the eighth resistance r8 to the seventh resistance r7 are substantially equal to $$\tan\left(\frac{180°}{N}\right),$$

where N is the Nth order distortion.

Figure 7:
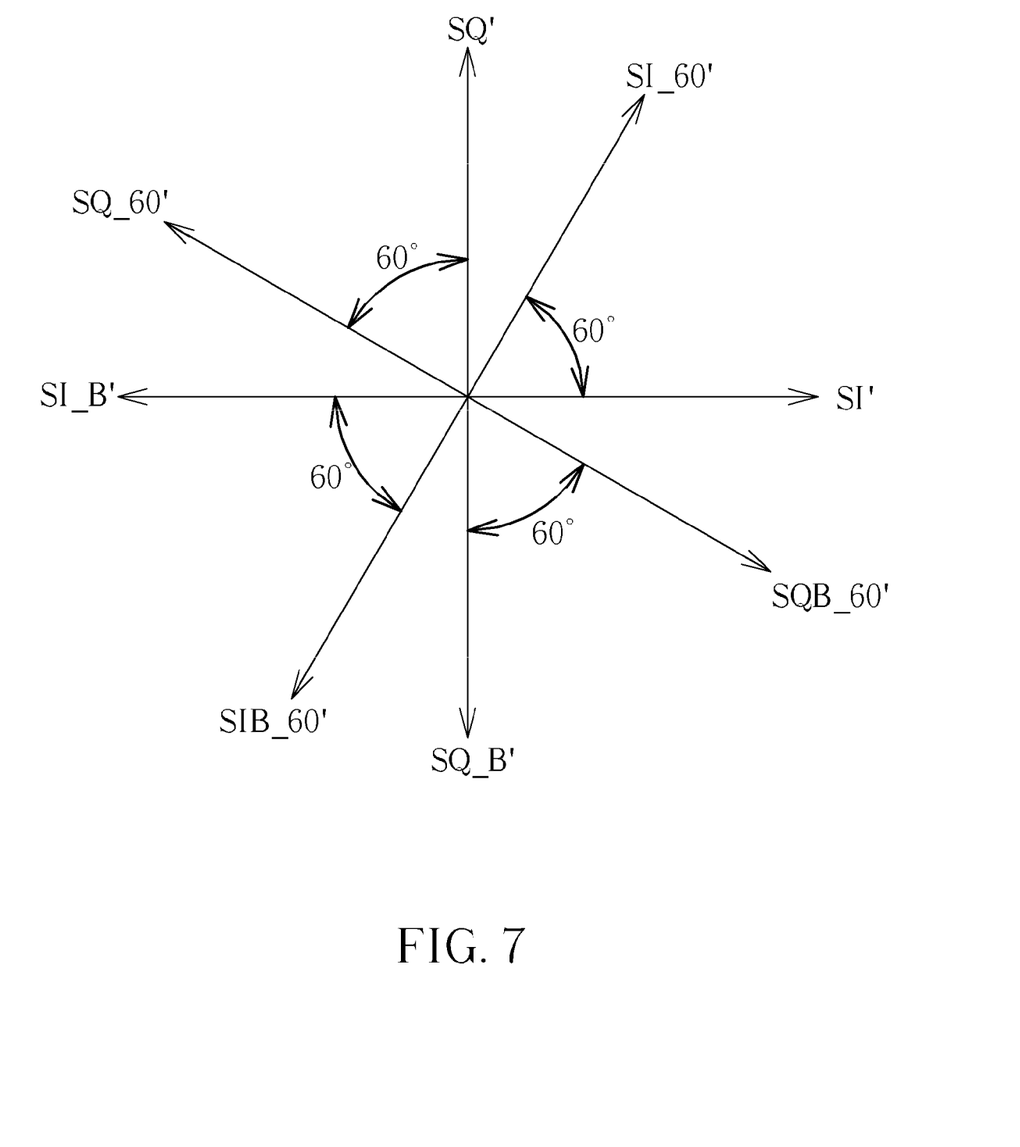
FIG. 7 is a phase diagram illustrating the phase relationships between the I-channel signals, the Q-channel signals, complementary I-channel input signals, and complementary Q-channel input signals of the phase shifter shown in FIG. 6.

For the above-mentioned example shown in FIG. 2, when the phase difference (i.e., the phase difference between the first phase P1" and the second phase P2") between the phases of the I-channel signal SI' of the first baseband signal Sb1 and the I-channel signal SI_60' of the second baseband signal Sb2, the phase difference between the phases of the complementary I-channel input signal SI_B' of the first baseband signal Sb1 and the complementary I-channel signal SIB_60' of the second baseband signal Sb2, the phase difference between the phases of the Q-channel signal SQ' of the first baseband signal Sb1 and the Q-channel signal SQ_60' of the second baseband signal Sb2, and the phase difference between the phases of the complementary Q-channel input signal SQ_B' of the first baseband signal Sb1 and the complementary Q-channel signal SQB_60' of the second baseband signal Sb2 are all required to be 60°, then N is equal to 3. When N=3, then $$\tan\left(\frac{180°}{N}\right)$$

is $\sqrt{3}$. Therefore, when the ratios of the second resistance r2 to the first resistance r1, the fourth resistance r4 to the third resistance r3, the sixth resistance r6 to the fifth resistance r5, and the eighth resistance r8 to the seventh resistance r7 are set to $\sqrt{3}$, the phase difference between the phases of the I-channel signal SI' of the first baseband signal Sb1 and the I-channel signal SI_60' of the second baseband signal Sb2, the phase difference between the phases of the complementary I-channel input signal SI_B' of the first baseband signal Sb1 and the complementary I-channel signal SIB_60' of the second baseband signal Sb2, the phase difference between the phases of the Q-channel signal SQ' of the first baseband signal Sb1 and the Q-channel signal SQ_60' of the second baseband signal Sb2, and the phase difference between the phases of the complementary Q-channel input signal SQ_B' of the first baseband signal Sb1 and the complementary Q-channel signal SQB_60' of the second baseband signal Sb2 are 60° as shown in FIG. 7. In other words, if the first resistance r1, the third resistance r3, the fifth resistance r5, and the seventh resistance r7 are set to 1KΩ, and the second resistance r2, the fourth resistance r4, the sixth resistance r6, and the eighth resistance r8 are set to 1.732KΩ.

FIG. 7 is a phase diagram illustrating the phase relationships between the I-channel signal SI', the I-channel signal SI_60', the Q-channel signal SQ', the Q-channel signal SQ_60', the complementary I-channel input signal SI_B', the complementary I-channel signal SIB_60', the complementary Q-channel input signal SQ_B', and the complementary Q-channel signal SQB_60' in the FIG. 6. Since the phase differences between the I-channel signal SI' and the Q-channel signal SQ', and the complementary I-channel input signal SI_B' and the complementary Q-channel input signal SQ_B' are substantially 90°, the phase of the I-channel signal SI_60' with respect to the phase of the I-channel signal SI' is shifted to 60° by the first resistor R1 and the second resistor R2. Similarly, the phase of the complementary I-channel signal SIB_60' with respect to the phase of the complementary I-channel input signal SI_B' is shifted to 60° by the third resistor R3 and the fourth resistor R4, the phase of the Q-channel signal SQ_60' with respect to the phase of the Q-channel signal SQ' is shifted to 60° by the fifth resistor R5 and the sixth resistor R6, and the phase of the complementary Q-channel signal SQB_60' with respect to the phase of the complementary Q-channel input signal SQ_B' is shifted to 60° by the seventh resistor R7 and the eighth resistor R8, as shown in FIG. 7. It should be noted that the above mentioned embodiment only serves as an example, and those skilled in this art will understand that the phase shifter 201 shown in FIG. 6 can generate any phases of the I-channel signal SI_60', the complementary I-channel signal SIB_60', the Q-channel signal SQ_60', and the complementary Q-channel signal SQB_60' through modifying the resistances of the first resistor R1, the second resistor R2, the third resistor R3, the fourth resistor R4, the fifth resistor R5, the sixth resistor R6, the seventh resistor R7, and the eighth resistor R8. Furthermore, the phase shifter 201 configured in passive voltage divider also possesses the function of noise filtering upon the input signal Sin, and does not consume additional current. In another embodiment of the present invention, the phase shifter 201 configured in passive voltage divider may be combined with an RC (Resistor-Capacitor) filter at the output terminal of a digital-to-analog converter preceding the signal transmitter.

Figure 8:
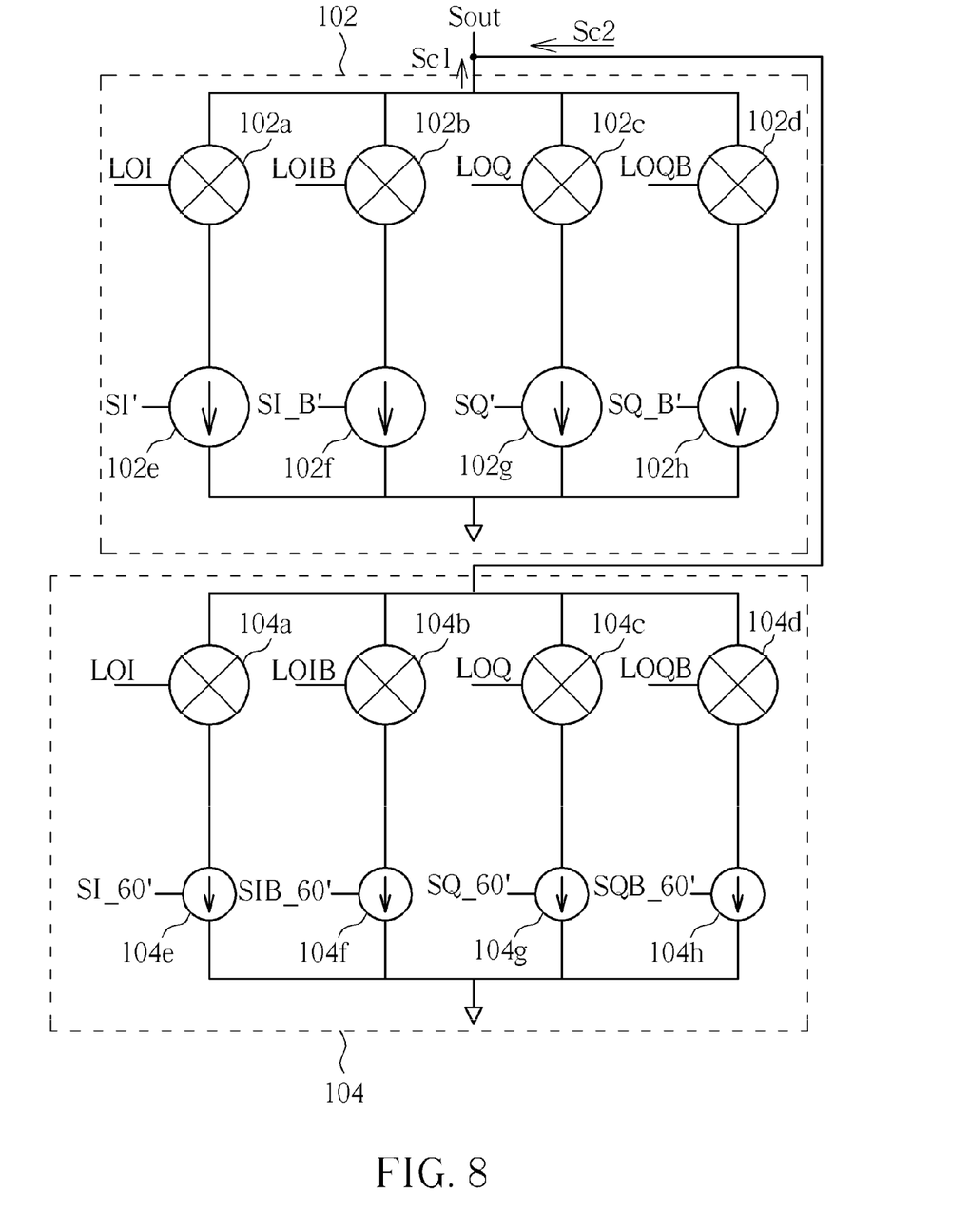
FIG. 8 is a diagram illustrating a first up-converter and a second up-converter of the signal processing apparatus according to the embodiments of the present invention.

Please refer to FIG. 6 in conjunction with FIG. 8. FIG. 8 is a diagram illustrating the first up-converter 102 and the second up-converter 104 of the signal processing apparatus 100 according to an embodiment of the present invention. In this embodiment, the first up-converter 102 comprises four mixing elements 102a-102d coupled to four transconducting elements 102e-102h respectively, and the second up-converter 104 comprises four mixing elements 104a-104d coupled to four transconducting elements 104e-104h respectively. The mixing elements 102a-102d and 104a-104d are coupled to the reference clock LO, wherein the reference clock LO coupled to the mixing elements 102a-104a, 102b-104b, 102c-104c, 102d-104d are labeled as LOI, LOIB, LOQ, and LOQB, respectively. The transconducting elements 102e-102h are coupled to the I-channel input signal SI', the complementary I-channel input signal SI_B', the Q-channel input signal SQ', and the complementary Q-channel input signal SQ_B', respectively. The transconducting elements 104e-104h are coupled to the I-channel signal SI_60', the complementary I-channel signal SIB_60', the Q-channel signal SQ_60', and the complementary Q-channel signal SQB_60', respectively.

The first up-converted signal Sc1 is generated by combining all of the outputs of the four mixing elements 102a-102d, and the second up-converted signal Sc2 is generated by combining all of the outputs of the four mixing elements 104a-104d. In this embodiment, the total size of the four mixing elements 102a-102d are designed to equal the total size of the four mixing elements 104a-104d, and the total size of the four transconducting elements 102e-102h are designed to equal the total size of the four transconducting elements 104e-104h, however this is not a limitation of the embodiment, those skilled in this art may adjust the size of each mixing element and the size of each transconducting element according to the system requirements. In this embodiment, the total size of the first up-converter 102 and the second up-converter 104 is the same as the size of the conventional IQ modulator, in which the conventional IQ modulator modulates an input baseband signal by a clock signal without phase shifting. Please note that, in FIG. 8, to more clearly illustrate the operation of the first up-converter 102 and the second up-converter 104, the output signal Sout is generated by directly combining the first up-converted signal Sc1 and the second up-converted Sc2 rather than being amplified by the first amplifier 103 and the second amplifier 105 respectively.

Accordingly, the signal transmitter possesses excellent performance under a low power supply since the third order inter-modulating distortion induced by the low power supply can be solved by the above-mentioned disclosure, and the burden of the LO path of the signal transmitter is not increased as well. Furthermore, the linearity requirement of the input signal Sin can be relaxed and the degeneration resistors, which are utilized in the conventional operational amplifier boosting circuit, in the first transconducting circuit 1022 and the second transconducting circuit 1042 may not be necessary. Therefore, by using the present method of the embodiment, the input signal Sin with larger input power can be fed to the signal processing apparatus 100 when the output power of the output signal Sout is kept intact, then the noise performance of the signal processing apparatus 100 is improved. Since the conventional operational amplifier boosting circuit in the first transconducting circuit 1022 and the second transconducting circuit 1042 are omitted, the hardware (so do the consuming power) of the signal processing apparatus 100 is moderate.

Figure 9:
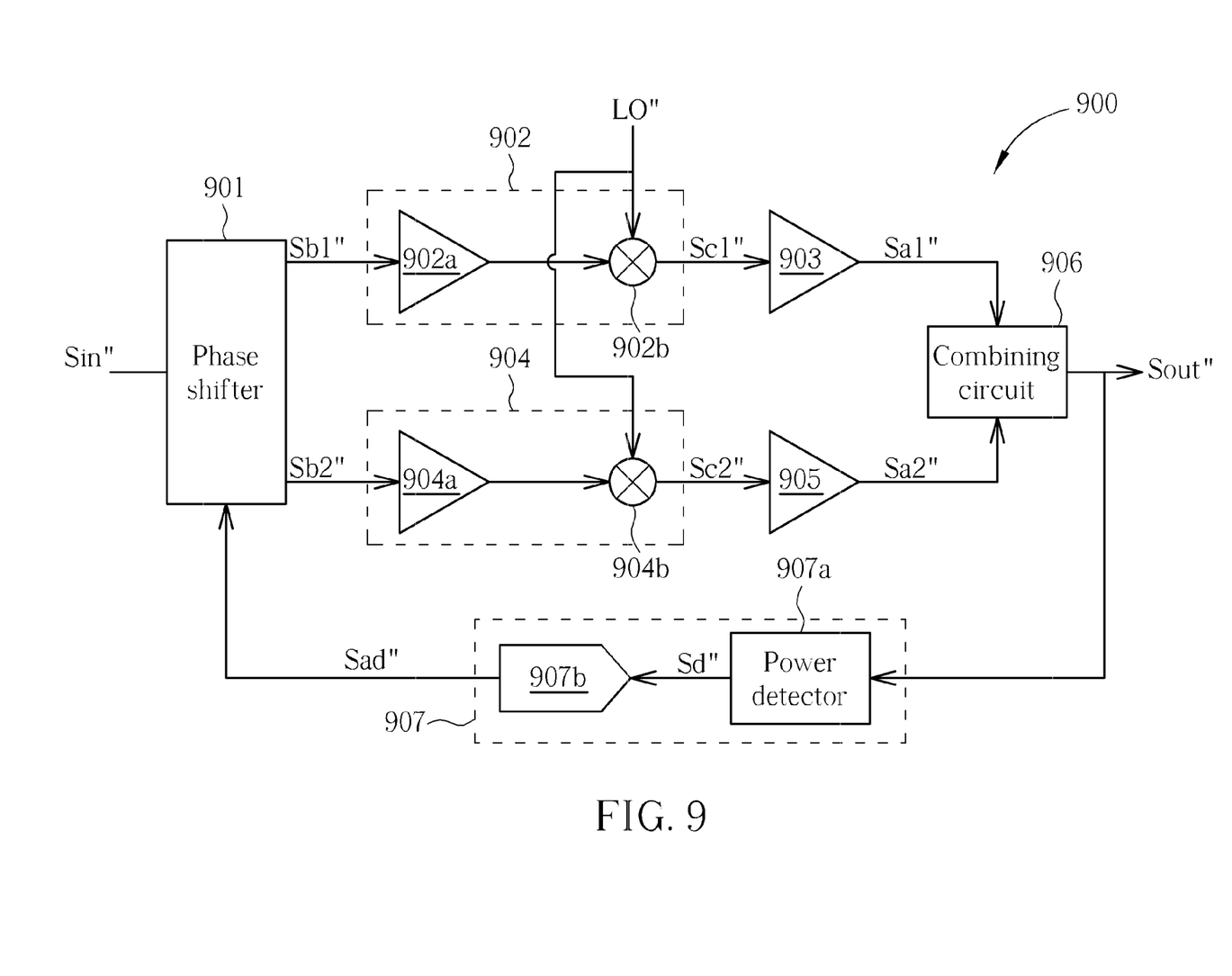
FIG. 9 is a diagram illustrating the signal processing apparatus according to a second embodiment of the present invention.

FIG. 9 is a diagram illustrating a signal processing apparatus 900 according to a second embodiment of the present invention. The signal processing apparatus 900 is applicable in a signal transmitter. The signal processing apparatus 900 comprises a first up-converter 902, a first amplifier 903, a second up-converter 904, a second amplifier 905, a combining circuit 906, and an adjusting circuit 907. For example, a phase shifter 901 can be utilized to generate a first and second baseband signals Sb1" and Sb2". More particularly, the phase shifter 901 receives a baseband input signal Sin" and generates a first baseband signal Sb1" with a first phase P1" and a second baseband signal Sb2" with a second phase P2" different from the first phase P1". The first up-converter 902, which comprises a transconducting circuit 902a and a mixer 902b, is coupled to the phase shifter 901 to receive the first baseband signal Sb1" and up-convert the first baseband signal Sb1" to generate a first up-converted signal Sc1" with a reference clock LO". The second up-converter 904, which comprises a transconducting circuit 904a and a mixer 904b, is coupled to the phase shifter 901 to receive the second baseband signal Sb2" and up-convert the second baseband signal Sb2" to generate a second up-converted signal Sc2". The first amplifier 903 is coupled to the first up-converter 902 for amplifying the first up-converted signal Sc1" to generate a first amplified signal Sa1". The second amplifier 905 is coupled to the second up-converter 904 for amplifying the second up-converted signal Sc2" to generate a second amplified signal Sa2". The combining circuit 906 is coupled to the first amplifier 903 and the second amplifier 905 for combining the first amplified signal Sa1" and the second amplified signal Sa2" to generate an output signal Sout". The adjusting circuit 907 is coupled between the combining circuit 906 and the phase shifter 901 for detecting the output signal Sout" to generate an adjusting signal Sad" to feedback to the phase shifter 901 for adjusting at least one of the first phase P1" and the second phase P2". As in the above-mentioned signal processing apparatus 100, the first phase P1" and the second phase P2" may not be exactly 180°/N out of phase for the sake of the preceding circuits of the phase shifter 901, thus the adjusting circuit 907 is introduced to fine tune the phase shifter 901 to calibrate the phase difference between the first phase P1" and the second phase P2" in order to effectively eliminate the third order inter-modulation tones in the output signal Sout".

In this embodiment, the adjusting circuit 907 comprises a power detector 907a and a digital-to-analog converter 907b. The power detector 907a is coupled to the combining circuit 906 for detecting a power of the output signal Sout" to generate a detected value Sd". The digital-to-analog converter 907b is coupled between the power detector 907a and the phase shifter 907b for up-converting the detected value Sd" into the adjusting signal Sad". When the adjusting circuit 907 detects that a total power of a first specific amplified signal Sim1" and a second specific amplified signal Sim2" in the output signal Sout" reaches a predetermined power level, the adjusting circuit 907 outputs the adjusting signal Sad" to the phase shifter 901 for adjusting at least one of the first phase P1" and the second phase P2". Please note that the first specific amplified signal Sim1" and the second specific amplified signal Sim2" correspond to the third order inter-modulation tones of the output signal Sout" as mentioned in the signal processing apparatus 100. Therefore, the power detector 907a detects the signal power at the frequency (e.g., Flo−3*Fsb1 in FIG. 2) where the third order inter-modulation tones may emerge in the output signal Sout" to determine if the third order inter-modulation tones are clearly eliminated. When the power detector 907a detects that the third order inter-modulation tones still exist, the power detector 907a outputs the detected signal Sd" to the digital-to-analog converter 907b. The digital-to-analog converter 907b converts the detected signal Sd" into a digital signal, i.e., adjusting signal Sad", to adjust at least one of the first phase P1" and the second phase P2".

Please refer to FIG. 3 and FIG. 6 again. In one embodiment, the adjusting signal Sad" may be utilized to adjust the aspect ratio of the third transistor 3 or adjust the aspect ratio of the sixth transistor 6 to adjust the phase of the I-channel signal SI_60. Furthermore, the adjusting signal Sad" may be utilized to adjust the aspect ratio of the seventh transistor 7 or adjust the aspect ratio of the eighth transistor 8 to adjust the phase of the Q-channel signal SQ_60. Please note that the adjusting signal Sad" may be utilized to adjust any combinations of aspect ratios of the transistors M1-M8 until the third order inter-modulation tones in the output signal Sout" are substantially eliminated.

In another embodiment, the adjusting signal Sad" may be utilized to adjust any combinations of the resistances r1-r8 of the resistors R1-R8 to vary the phases of the I-channel signal SI_60', the complementary I-channel signal SIB_60', the Q-channel signal SQ_60', or the complementary Q-channel signal SQB_60' until the third order inter-modulation tones in the output signal Sout" are substantially eliminated.

Figure 10:
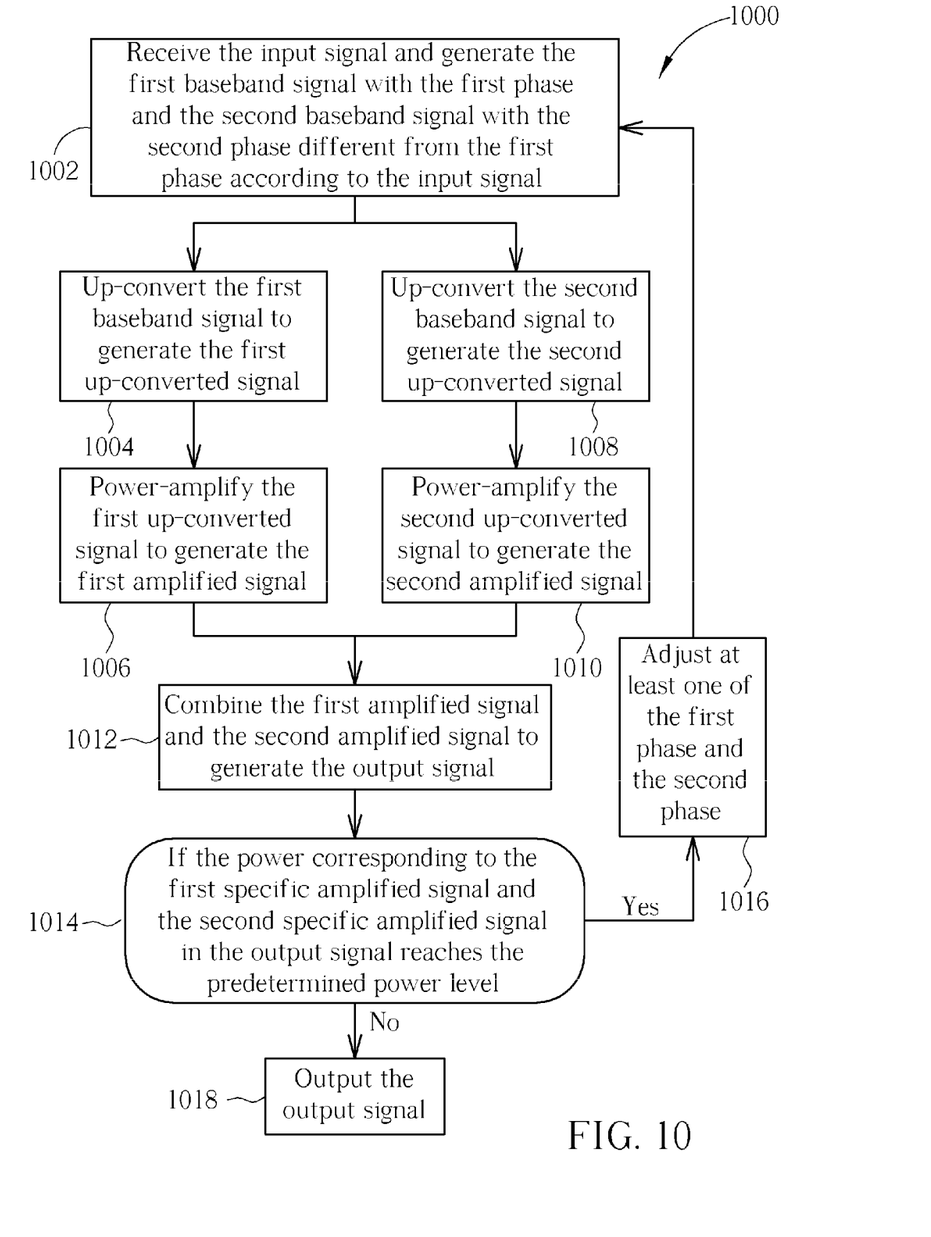
FIG. 10 is a flow chart illustrating a signal processing method according to a third embodiment of the present invention.

FIG. 10 is a flow chart illustrating a signal processing method 1000 according to an embodiment of the present invention. The signal processing method 1000 is applicable in the above-mentioned signal processing apparatuses 100, 900. Please note that, to more clearly illustrate the signal processing method 1000, the signal processing method 1000 is described in conjunction with the signal processing apparatus 900 herein. Provided that substantially the same result is achieved, the steps of the flowchart shown in FIG. 10 need not be in the exact order shown and need not be contiguous; that is, other steps can be intermediate. The signal processing circuit method 1000 comprises the following steps:

Step 1002: Receive the input signal Sin" and generate the first baseband signal Sb1" with the first phase P1" and the second baseband signal Sb2" with the second phase P2" different from the first phase P1" according to the input signal Sin", go to step 1004 and step 1008 consecutively;

Step 1004: Up-convert the first baseband signal Sb1" to generate the first up-converted signal Sc1";

Step 1006: Power-amplify the first up-converted signal Sc1" to generate the first amplified signal Sa1", go to step 1012;

Step 1008: Up-convert the second baseband signal Sb2" to generate the second up-converted signal Sc2";

Step 1010: Power-amplify the second up-converted signal Sc2" to generate the second amplified signal Sa2", go to step 1012;

Step 1012: Combine the first amplified signal Sa1" and the second amplified signal Sa2" to generate the output signal Sour;

Step 1014: Determine if the power corresponding to the first specific amplified signal Sim1" and the second specific amplified signal Sim2" in the output signal Sour reaches the predetermined power level, if yes, go to step 1016, if no, go to step 1018;

Step 1016: Adjust at least one of the first phase P1" and the second phase P2", go to step 1002;

Step 1018: Output the output signal Sout".

When the first specific amplified signal Sim1" and the second specific amplified signal Sim2" are N order inter-modulation tones of the first amplified signal Sa1" and the second amplified signal Sa2", respectively, the first phase P1" and the second phase P2" are set to be substantially 180°/N out of phase. For example, when the first specific amplified signal Sim1" and the second specific amplified signal Sim2" are third order inter-modulation tones of the first amplified signal Sa1" and the second amplified signal Sa2", respectively, the first phase P1" and the second phase P2" are set to be substantially 60° out of phase. When the first baseband signal Sb1" is up-converted in step 1004 and power-amplified in step 1006, and when the second baseband signal Sb2" is up-converted in step 1008 and power-amplified in step 1010, the third order inter-modulation tones of the first amplified signal Sa1" and the third order inter-modulation tones of the second amplified signal Sa2" are substantially 180° out of phase. Therefore, when the first amplified signal Sa1" and the second amplified signal Sa2" are combined in step 1012, the third order inter-modulation tones of the first amplified signal Sa1" and the third order inter-modulation tones of the second amplified signal Sa2" may cancel each other as shown in FIG. 2.

To guarantee the power of the third order inter-modulation tones in the output signal Sout" is clean, step 1014 is introduced to detect the power corresponding to the first specific amplified signal Sim1" and the second specific amplified signal Sim2" in the output signal Sout". When the power reaches the predetermined power level, at least one of the first phase P1" and the second phase P2" is adjusted in step 1016. When the third order inter-modulation tones in the output signal Sout" are eliminated, the output signal Sout" is output again in step 1018.

Briefly, by shifting the input signal into two signals with different phases, and up-converting the two signals by two up-converting paths respectively, the above-mentioned embodiments induce the first inter-modulation tones generated in the first up-converting path and the second inter-modulation tones generated in the second up-converting path to be substantially 180° out of phase, thereby eliminating the inter-modulation tones in the output signal. In other words, the present method cancels the close-in spurious tone of the output signal (Sout and Sout") instead of the harmonics of the reference clock (LO and LO").

Those skilled in the art will readily observe that numerous modifications and alterations of the device and method may be made while retaining the teachings of the invention.

What is claimed is:

1. A radio frequency (RF) modulator, comprising:
means for up-converting a first and second baseband signals into a first and second up-converted signals with a reference clock, wherein a phase difference between the first and second baseband signals substantially equals 180°/N such that N-th order inter-modulation tone in the output signal is reduced; and
means for combining the first and second up-converted signals to generate an output signal including the reduced N-th order inter-modulation tone and a main signal.

2. The RF modulator of claim 1, wherein the means for up-converting the first and second baseband signals into the first and second up-converted signals with the reference clock comprises:
a first transconducting circuit, for transforming the first baseband signal into a first transconducted signal;
a first mixer, for mixing the first transconducted signal with the reference clock to generate the first up-converted signal;
a second transconducting circuit, for transforming the second baseband signal into a second transconducted signal; and
a second mixer, for mixing the second transconducted signal with the reference clock to generate the second up-converted signal.

3. The RF modulator of claim 1, further comprising:
phase shifting means for receiving a baseband input signal to generate the first and second baseband signals; and
amplification means for amplifying the first and second up-converted signals before the first and second up-converted signals being combined by the means for combining the first and second up-converted signals to generate the output signal.

4. The RF modulator of claim 3, wherein the phase shifting means is embedded in a baseband chip or is implemented by a physical circuitry outside the baseband chip.

5. The RF modulator of claim 3, wherein the first amplified signal comprises a first specific amplified signal, and the second amplified signal comprises a second specific amplified signal; and when the first specific amplified signal and the second specific amplified signal are N-th order inter-modulation tones of the first amplified signal and the second amplified signal, respectively, the phase shifting means sets the phase difference between the first and the second baseband signals to be substantially 180°/N.

6. The RF modulator of claim 3, wherein the baseband input signal comprises an I-channel input signal and a Q-channel input signal, and the phase shifting means is operated in current mode to generate the first and the second baseband signals with the phase difference.

7. The RF modulator of claim 3, wherein the baseband input signal comprises an I-channel input signal and a Q-channel input signal, and the phase shifting means is operated in voltage mode to generate the first and the second baseband signals with the phase difference.

8. The RF modulator of claim 3, further comprising:
adjusting means, for detecting the output signal to generate an adjusting signal to the phase shifting means for adjusting at least one phase of the first and second baseband signals.

9. The RF modulator of claim 8, wherein the adjusting means comprises:
a power detector, for detecting a power of the output signal to generate a detected value; and
a digital-to-analog converter, for converting the detected value into the adjusting signal;
wherein when the adjusting means detects that a power corresponding to one of the first specific amplified signal and the second specific amplified signal in the output signal reaches a predetermined power level, the adjusting means outputs the adjusting signal to the shifting means.

10. A signal processing apparatus, comprising:
a first up-converter, receiving a first baseband signal with a first phase and receiving a reference clock, for up-converting the first baseband signal to generate a first up-converted signal with the reference clock;
a second up-converter, receiving a second baseband signal with a second phase different from the first phase and receiving the reference clock, for up-converting the second baseband signal to generate a second up-converted signal with the reference clock;
a first amplifier, coupled to the first up-converter, for amplifying the first up-converted signal to generate a first amplified signal;
a second amplifier, coupled to the second up-converter, for amplifying the second up-converted signal to generate a second amplified signal; and
a combining circuit, coupled to the first amplifier and the second amplifier, for combining the first amplified signal and the second amplified signal to generate an output signal including a reduced N-th order inter-modulation tone and a main signal;
wherein a phase difference between the first phase and the second phase substantially equals 180°/N such that N-th order inter-modulation tone in the output signal is reduced.

11. The signal processing apparatus of claim 10, wherein the first up-converter comprises:
a first transconducting circuit, receiving the first baseband signal, for transforming the first baseband signal into a first transconducted signal; and
a first mixer, coupled to the first transconducting circuit and the reference clock, for mixing the first transconducted signal with the reference clock to generate the first up-converted signal; and
the second up-converter comprises:
a second transconducting circuit, receiving the second baseband signal, for transforming the second baseband signal into a second transconducted signal; and
a second mixer, coupled to the second transconducting circuit and the reference clock, for mixing the second transconducted signal with the reference clock to generate the second up-converted signal.

12. The signal processing apparatus of claim 10, further comprising:
a phase shifter, coupled to the first up-converter and the second up-converter, for receiving a baseband input signal and generating the first baseband signal and the second baseband signal according to the baseband input signal.

13. The signal processing apparatus of claim 12, wherein the first amplified signal comprises a first specific amplified signal, and the second amplified signal comprises a second specific amplified signal; and when the first specific amplified signal and the second specific amplified signal are N-th order inter-modulation tones of the first amplified signal and the second amplified signal, respectively, the phase shifter sets the phase difference between the first phase and the second phase to be substantially 180°/N.

14. The signal processing apparatus of claim 13, wherein the baseband input signal comprises an I-channel input signal and a Q-channel input signal, and the phase shifter comprises:
a first transistor, for receiving the I-channel input signal;
a second transistor, coupled to the first transistor, for mirroring the I-channel input signal to generate an I-channel signal of the first baseband signal;
a third transistor, coupled to the first transistor, for mirroring the I-channel input signal to generate a first mirrored signal;
a fourth transistor, for receiving the Q-channel input signal;
a fifth transistor, coupled to the fourth transistor, for mirroring the Q-channel input signal to generate a Q-channel signal of the first baseband signal;
a sixth transistor, coupled to the forth transistor and the third transistor, for mirroring the Q-channel input signal to generate a second mirrored signal, wherein the first mirrored signal is combined with the second mirrored signal for generating one of an I-channel signal and a Q-channel signal of the second baseband signal;
a seventh transistor, coupled to the first transistor, for mirroring the I-channel input signal to generate a third mirrored signal; and
an eighth transistor, coupled to the fourth transistor and the seventh transistor, for mirroring the Q-channel input signal to generate a fourth mirrored signal, wherein the third mirrored signal is combined with the fourth mirrored signal for generating the other of the I-channel signal and the Q-channel signal of the second baseband signal;
wherein aspect ratios of the second transistor, the third transistor, the fifth transistor, and the sixth transistor are substantially equal to 1:A:1:B, aspect ratios of the second transistor, the seventh transistor, the fifth transistor, and the eighth transistor are substantially equal to 1:B:1:A, and B/A is substantially equal to $$\tan\left(\frac{180°}{N}\right).$$

15. The signal processing apparatus of claim 13, wherein the baseband input signal comprises an I-channel input signal, a complementary I-channel input signal, a Q-channel input signal, and a complementary Q-channel input signal, and the phase shifter comprises:
a first resistor, having a first resistance, for receiving the Q-channel input signal;
a second resistor, having a second resistance, for receiving the I-channel input signal, wherein a common terminal of the first resistor and the second resistor outputs an I-channel signal of the second baseband signal;
a third resistor, having a third resistance, for receiving the complementary Q-channel input signal;
a fourth resistor, having a fourth resistance, for receiving the complementary I-channel input signal, wherein a common terminal of the third resistor and the fourth resistor outputs an complementary I-channel signal of the second baseband signal;

a fifth resistor, having a fifth resistance, for receiving the complementary I-channel input signal;

a sixth resistor, having a sixth resistance, for receiving the Q-channel input signal, wherein a common terminal of the fifth resistor and the sixth resistor outputs a Q-channel signal of the second baseband signal;

a seventh resistor, having a seventh resistance, for receiving the I-channel input signal; and an eighth resistor, having an eighth resistance, for receiving the complementary Q-channel input signal, wherein a common terminal of the seventh resistor and the eighth resistor outputs an complementary Q-channel signal of the second baseband signal;

wherein ratios of the second resistance to the first resistance, the fourth resistance to the third resistance, the sixth resistance to the fifth resistance, and the eighth resistance to the seventh resistance are substantially equal to $$\tan\left(\frac{180°}{N}\right).$$

16. The signal processing apparatus of claim 12, further comprising:

an adjusting circuit, coupled between the combining circuit and the phase shifter, for detecting the output signal to generate an adjusting signal to the phase shifter for adjusting at least one of the first phase and the second phase.

17. The signal processing apparatus of claim 16, wherein the adjusting circuit comprises:

a power detector, coupled to the combining circuit, for detecting a power of the output signal to generate a detected value; and a digital-to-analog converter, coupled between the power detector and the phase shifter, for converting the detected value into the adjusting signal.

18. The signal processing apparatus of claim 16, wherein when the adjusting circuit detects that a total power of the first specific amplified signal and the second specific amplified signal in the output signal reaches a predetermined power level, the adjusting circuit outputs the adjusting signal to the phase shifter for adjusting at least one of the first phase and the second phase.

19. A signal processing method, comprising:

up-converting a first and second baseband signals into a first and second up-converted signals with a reference clock, wherein a phase difference between the first and second baseband signals substantially equals 180°/N such that N-th order inter-modulation tone in the output signal is reduced; and combining the first and second up-converted signals to generate an output signal including the reduced N-th order inter-modulation tone and a main signal.

20. The signal processing method of claim 19, wherein the step of up-converting the first and second baseband signals into the first and second up-converted signals with the reference clock comprises:

transforming the first baseband signal into a first transconducted signal;

mixing the first transconducted signal with the reference clock to generate the first up-converted signal;

transforming the second baseband signal into a second transconducted signal; and mixing the second transconducted signal with the reference clock to generate the second up-converted signal.

21. The signal processing method of claim 19, further comprising:

receiving a baseband input signal to generate the first and second baseband signals; and amplifying the first and second up-converted signals before the first and second up-converted signals being combined.

22. The signal processing method of claim 21, wherein the first amplified signal comprises a first specific amplified signal, and the second amplified signal comprises a second specific amplified signal; and when the first specific amplified signal and the second specific amplified signal are N-th order inter-modulation tones of the first amplified signal and the second amplified signal, respectively, the step of receiving the baseband input signal to generate the first and second baseband signals comprises:

setting the phase difference between the first and the second baseband signals to be substantially 180°/N.

23. The signal processing method of claim 21, wherein the baseband input signal comprises an I-channel input signal and a Q-channel input signal.

24. The signal processing method of claim 21, further comprising:

detecting the output signal to generate an adjusting signal for adjusting at least one phase of the first and second baseband signals.

25. The signal processing method of claim 24, wherein the step of detecting the output signal to generate the adjusting signal for adjusting at least one phase of the first and second baseband signals comprises:

detecting a power of the output signal to generate a detected value; and converting the detected value into the adjusting signal;

wherein when detecting that a power corresponding to one of the first specific amplified signal and the second specific amplified signal in the output signal reaches a predetermined power level, outputting the adjusting signal.

* * * * *